US009221244B2

(12) United States Patent
Gordon et al.

(10) Patent No.: US 9,221,244 B2
(45) Date of Patent: Dec. 29, 2015

(54) METHOD TO REDUCE SURFACE RESISTIVITY OF A RELEASE AGENT APPLICATOR IN A PRINTING APPARATUS (71) Applicant: Xerox Corporation, Norwalk, CT (US)

(72) Inventors: Michael C. Gordon, Sammamish, WA (US); Gregory J. Lapinski, Portland, OR (US); Gregory Hjelmeland, Beaverton, OR (US); Michael P. O'Dierno, Beaverton, OR (US); Edward F. Burress, West Linn, OR (US); Devin R. Bailly, Portland, OR (US); Michael J. Engle, Canby, OR (US); Steven B. Gazeley, West Linn, OR (US); Brian G. Russell, Seattle, WA (US); David J. Houston, West Linn, OR (US)

(73) Assignee: Xerox Corporation, Norwalk, CT (US)

(*) Notice: Subject to any disclaimer, the term of this patent is extended or adjusted under 35 U.S.C. 154(b) by 137 days.

(21) Appl. No.: 14/196,880

(22) Filed: Mar. 4, 2014

(65) Prior Publication Data

US 2014/0184711 A1 Jul. 3, 2014

Related U.S. Application Data (62) Division of application No. 13/353,732, filed on Jan. 19, 2012, now Pat. No. 8,679,590.

(51) Int. Cl.
*B41J 2/01* (2006.01)
*B41J 2/005* (2006.01)
*B05C 1/00* (2006.01)
*C09D 5/24* (2006.01)
*C08K 3/00* (2006.01)
*G03G 15/20* (2006.01)

(52) U.S. Cl.
CPC ............... *B41J 2/0057* (2013.01); *B05C 1/00* (2013.01); *C08K 3/0066* (2013.01); *C09D 5/24* (2013.01); *G03G 15/2025* (2013.01)

(58) Field of Classification Search
CPC ........................ B41J 2/057; B41J 2002/012
USPC .......................................................... 347/103
See application file for complete search history.

(56) References Cited

U.S. PATENT DOCUMENTS

| 5,735,945 | A | 4/1998 | Chen et al. |
|---|---|---|---|
| 5,805,969 | A | 9/1998 | Elsermans et al. |
| 6,451,438 | B1 | 9/2002 | Chiang et al. |
| 6,566,027 | B2 | 5/2003 | Kaplan et al. |
| 7,048,369 | B2 | 5/2006 | Rousseau et al. |
| 7,362,994 | B2 | 4/2008 | Zess et al. |
| 2008/0146427 | A1 | 6/2008 | Osaku |
| 2010/0018417 | A1 | 1/2010 | Gervasi et al. |
| 2010/0055589 | A1 | 3/2010 | Qi et al. |
| 2011/0149002 | A1* | 6/2011 | Kessler .................. B41J 29/17 347/103 |

* cited by examiner

*Primary Examiner* — Julian Huffman
(74) *Attorney, Agent, or Firm* — Maginot, Moore & Beck, LLP (57) ABSTRACT A release agent applicator displaying decreased and consistent surface resistivity, and a method of making same. The release agent applicator includes an foam delivery surface having an ionic layer such that the surface resistivity of the delivery surface is reduced, thereby decreasing the chances of static charge accumulation on the roller that may interfere with high quality printing.

18 Claims, 5 Drawing Sheets

METHOD TO REDUCE SURFACE RESISTIVITY OF A RELEASE AGENT APPLICATOR IN A PRINTING APPARATUS

PRIORITY CLAIM

This application is a divisional application that claims priority from U.S. patent application Ser. No. 13/353,732, which is entitled "Method To Reduce Surface Resistivity Of A Release Agent Applicator In A Printing Apparatus" and was filed on Jan. 19, 2012. This application issued as U.S. Pat. No. 8,679,590 on Mar. 25, 2014.

TECHNICAL FIELD

The method described below relates to solid ink printers, and more particularly to release agent application systems used in these printers.

BACKGROUND

An offset or indirect solid ink printer typically utilizes a series of rollers to fix solid ink to a print surface to form a printed image. In general, solid ink is loaded into a printer and then melted to produce liquid ink that is ejected onto an intermediate imaging member to form an ink image on the surface. In the offset print process, the intermediate imaging surface is frequently the surface of a rotating drum, belt, or band, often referred to as an imaging drum. Thereafter, print media, such as paper, is moved proximate the surface of the rotating intermediate imaging member in synchronization with the ink images formed on the surface of the imaging drum. The media surface is pressed against the surface of the rotating imaging member as the media passes through a nip formed between the rotating member and a transfix roller. The ink image is transferred and affixed to the print media by the pressure in the nip.

To address accumulation of ink on an imaging roller, offset solid ink printers often utilize a release agent (e.g., silicon oil) to aid in the clean release of the solid ink from the imaging drum to the print surface. The release agent is applied to the imaging surface before the ink is ejected to help reduce the likelihood of ink adhering to the imaging drum. In many offset solid ink printers, a release agent applicator remains in contact with a reservoir of the release agent and is selectively moved into contact with the imaging drum to apply the release agent. The applicator is then moved out of contact with the imaging drum so the ink image can be formed on the rotating surface and once the image is transferred to the media, the applicator is brought back into contact with the imaging surface to apply a fresh layer of release agent.

Because release agent is typically electrically insulating, and the release agent applicator is often made from an electrically insulating composition, such as urethane or other foam, friction between the release agent applicator and the imaging drum can cause a static charge to accumulate on the layer of release agent that is coating the release agent applicator. The static charge can accumulate to the point where the accumulated electro-motive force difference between the charged release agent and the imaging drum results in one or more drops of the release agent jumping from the release agent applicator to the imaging drum roller. These displaced drops of release agent onto the imaging drum may cause image quality defects.

Previous attempts at eliminating the issue of static charge accumulation on the release agent applicator surface include the use of a conductive urethane metering blade placed in contact with the release agent applicator to dissipate any accumulating charge, or utilizing a release agent applicator with a conductive surface. However, manufacturing a release agent applicator with a conductive surface has proven problematic, as such rollers often comprise a porous foam, which unevenly absorbs any conductive materials applied thereto. Such an uneven uptake produces an irregular ionic map on the finished surface of any such release agent applicator. The resulting applicator is incapable of dissipating the static charge buildup effectively.

SUMMARY

To address the accumulation of static charge on a release agent applicator system of a printing apparatus, a method for reducing the resistivity of a release agent applicator has been developed. According to the method, a release agent supply applicator with a delivery surface is treated with an ionic solution comprising at least one organic salt dissolved in a solvent by applying one or more coats of the ionic solution to the delivery surface of the release agent applicator to a level that reduces electrical resistivity.

In at least one other embodiment, a release agent applicator in a printing apparatus is described herein having a reduced surface resistivity. According to this embodiment, a release agent applicator comprises at least one substantially cylindrical shaft and a substantially cylindrical body radially surrounding the shaft, with the body having an outer surface comprising a foam. The release agent applicator further comprises an ionic layer adhered to the outer surface, the ionic layer having an organic compound and displaying a substantially consistent surface resistivity.

In certain optional embodiments, the ionic layer on the release agent applicator is formed through applying one or more coats of an ionic solution having at least one organic compound with at least one functional group selected from the group consisting of acetate, carbonate, phosphate, sulfate, oxide, nitrate, nitrite, hydroxide, citrate, cyanine, ammonium, pyridinium, amine, and halide.

DETAILED DESCRIPTION

The description below and the accompanying figures provide a general understanding of the environment for the method disclosed herein as well as the details for the method. In the drawings, like reference numerals are used throughout to designate like elements. The word "printer" as used herein encompasses any apparatus that generates an image on media with ink. The word "printer" includes, but is not limited to, a digital copier, a bookmaking machine, a facsimile machine, a multi-function machine, or the like.

Figure 1:
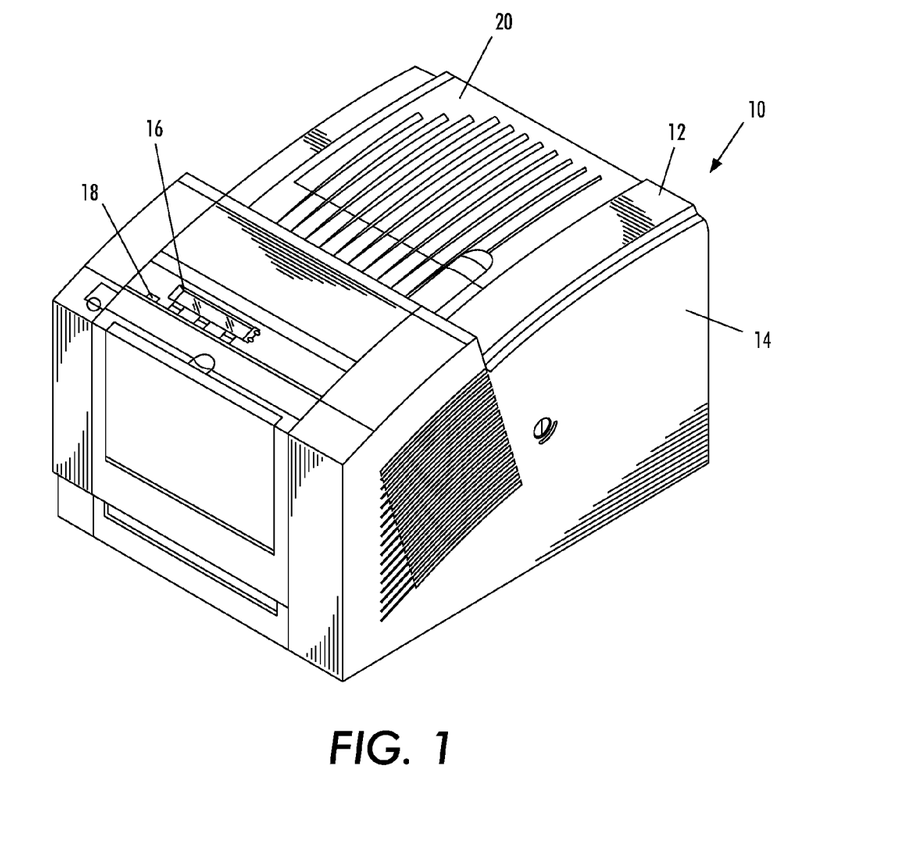
FIG. 1 is a perspective view of an ink printer with the printer top cover closed.

Referring to FIG. 1, a perspective view is shown of an ink printer 10 that uses an intermediate imaging member to generate images on media sheets. The reader should understand that the embodiment discussed herein may be implemented in many alternate forms and variations. In addition, any suitable size, shape or type of elements or materials may be used.

FIG. 1 shows an ink printer 10 that includes an outer housing having a top surface 12 and side surfaces 14. A user interface display, such as a front panel display screen 16, displays information concerning the status of the printer, and user instructions. Buttons 18 or other control elements for controlling operation of the printer are adjacent the user interface window, or may be at other locations on the printer. A solid ink printing mechanism (FIG. 2) is contained inside the housing. An ink feed system delivers ink to the printing mechanism. The ink feed system is positioned below the top surface of the printer housing and is accessed through a hinged cover 20 that opens to enable the loading of solid ink into the ink feed system.

Figure 2:
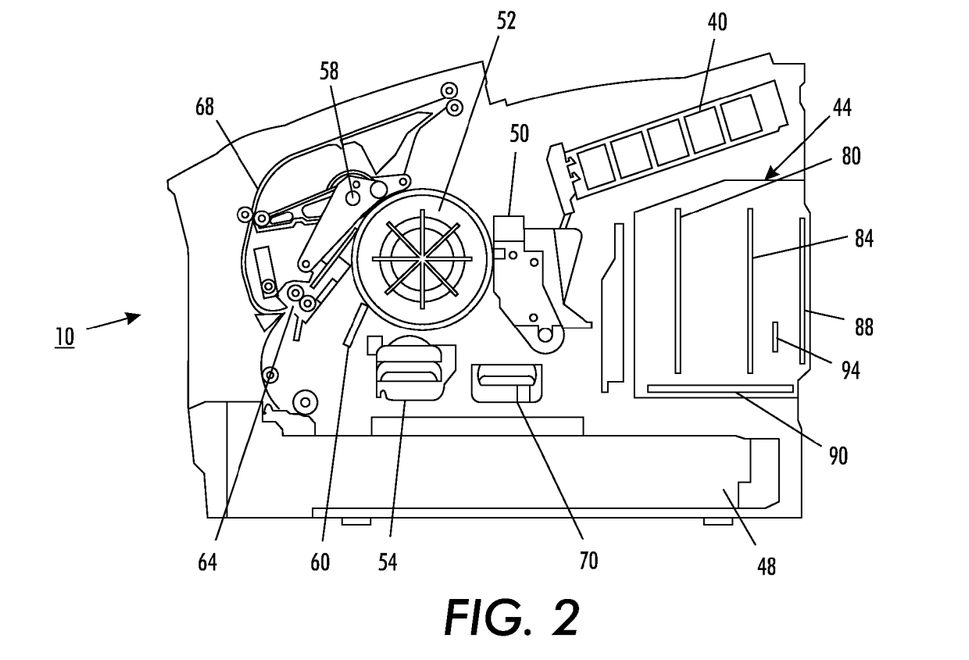
FIG. 2 is a side view of the ink printer shown in FIG. 1 depicting the major subsystems of the ink printer.

As shown in FIG. 2, the ink printer 10 may include an ink loading subsystem 40, an electronics module 44, a paper/media tray 48, a print head 50, an intermediate imaging member 52, a drum maintenance subsystem 54, a transfer subsystem 58, a wiper subassembly 60, a paper/media preheater 64, a duplex print path 68, and an ink waste tray 70. In brief, solid ink sticks are loaded into ink loader 40 through which they travel to a melt plate positioned at the end of the loader. At the melt plate, the ink stick is melted and the liquid ink is diverted to a reservoir in the print head 50. The ink is ejected by piezoelectric ejectors through apertures in chemically etched stainless plates to form an image on the intermediate imaging member 52 as the member rotates. A heater that is internal to the intermediate imaging member is regulated by a controller to maintain the imaging member within an optimal temperature range for forming an ink image on the surface of the member. A sheet of recording media is removed from the paper/media tray 48 and directed into the paper pre-heater 64 to bring the sheet of recording media to a more optimal temperature for receiving the ink image from the imaging member. A synchronizer delivers the sheet of the recording media to the nip formed between the transfix roller in the transfer subsystem 58 and the intermediate image member 52. The delivery of a media sheet is coordinated with the entry of the image on the imaging member into the nip for the transfer of the image to the recording media sheet.

The operations of the ink printer 10 are controlled by the electronics module 44. The electronics module 44 includes a power supply 80, a main board 84 with a controller, memory, and interface components (not shown), a hard drive 88, a power control board 90, and a configuration card 94. The power supply 80 generates various power levels for the various components and subsystems of the ink printer 10. The power control board 90 regulates these power levels. The configuration card contains data in nonvolatile memory that defines the various operating parameters and configurations for the components and subsystems of the ink printer 10. The hard drive stores data used for operating the ink printer and software modules that are loaded and executed in the memory on the main card 84. The main board 84 includes the controller that operates the ink printer 10 in accordance with the operating program executing in the memory of the main board 84. The controller receives signals from the various components and subsystems of the ink printer 10 through interface components on the main board 84. The controller also generates control signals that are delivered to the components and subsystems through the interface components. These control signals, for example, drive the piezoelectric ejectors to expel ink through the apertures in the chemically etched print plates to form the image on the imaging member 52 as the member rotates past the print head.

Figure 3:
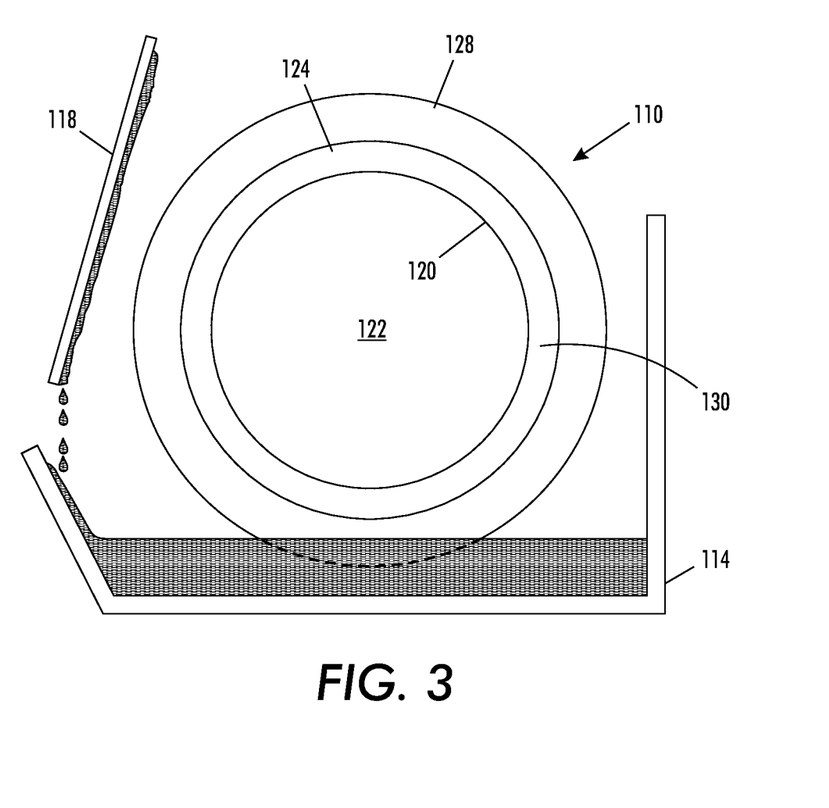
FIG. 3 is a side view of an release agent applicator system.

In order to reduce the likelihood that ink ejected onto the imaging member 52 remains on the imaging member after transfer of an image from the drum to a media sheet, a film of release agent is applied to the imaging member before ink is ejected onto the imaging member. A side view of an applicator system used to apply release agent to the imaging drum is depicted in FIG. 3. A release agent applicator 110 sits within a sump 114. The applicator is positioned within the sump to receive the release agent returned to the applicator system by a metering blade 118. Additionally, the roller 110 contains a supply of release agent within the cavity 122 of the tube 120. The applicator roller 110 is coupled to an engagement mechanism for moving the applicator 110 into and out of engagement with an imaging member 52. The metering blade 118 shown in FIG. 3 is positioned to meter release agent applied to the imaging member 52 by the applicator 110. The metering blade helps ensure that a uniform thickness of the release agent is present across the width of the imaging member 52. The blade is operatively connected to an actuator that is operated by a controller to move the blade into and out of engagement with the imaging member 52. Excess release agent removed by the blade 118 is diverted down the metering blade to the sump 114. In other embodiments, a structure separate from the blade 118 is provided to catch the diverted release agent and direct it back to the sump 114.

Figure 4:
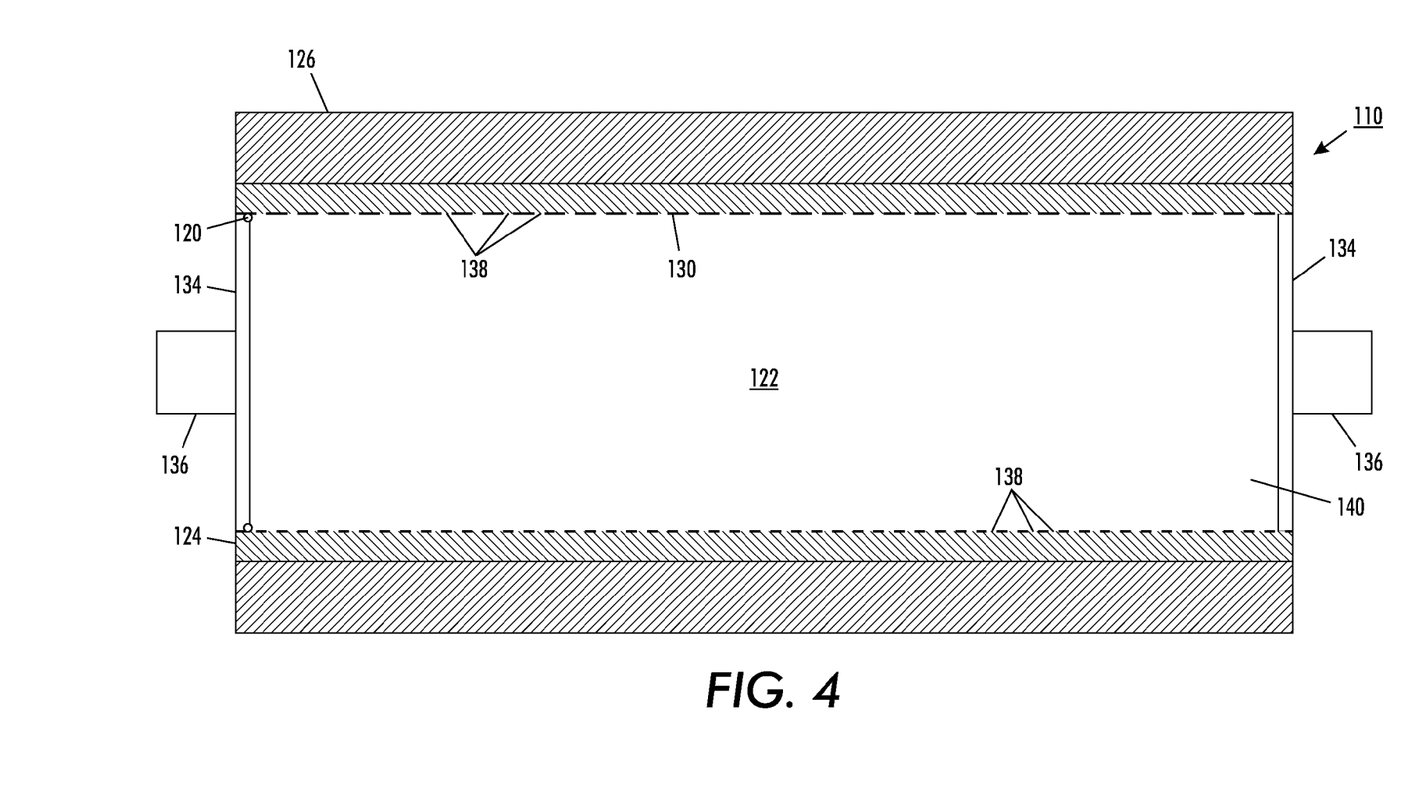
FIG. 4 is a cross-sectional view of a release agent applicator roller.

According to one embodiment, the release agent applicator 110 has the structure shown in FIG. 3 and FIG. 4. A release agent reservoir 122 is comprised of a tube 120 having a cylindrical wall 130 and two end caps 134. The cylindrical wall 130 is perforated with holes 138 (FIG. 4) to enable the release agent 140 to seep from the reservoir 122. A containment membrane 124 encases the cylindrical wall 130 to wick the release agent that seeps through the perforations 138 away from the cylindrical wall 130. Equilibrium in the containment membrane causes the release agent to flow through the membrane 124 to the delivery layer 128. The material used for the delivery layer 128 is matched to the material used for the containment layer 124 so that the release agent supply rate from the containment membrane maintains delivery layer saturation in a range of about 10% to about 90% of its release agent capacity. This capacity enables the delivery layer 128 to have sufficient release agent for copiously applying release agent to an imaging member, yet maintain reserve capacity for picking up release agent returned to the sump.

In further detail, the cylindrical wall 130 is manufactured from an oil phobic material, such as thermoplastic, sintered metal, ceramic, or the like. A plurality of perforations is formed in the cylindrical wall as part of its manufacture. In one embodiment, the perforations are approximately 12 μm in diameter, although other pore sizes may be used for various release agents and desired supply rates. In one embodiment, end caps 134 are made from the same or a compatible material. In the embodiment shown in FIG. 4, the end caps 134 have shafts 136 that are placed in journal bearings to enable rotation of the tube 130 for the application of release agent from the delivery layer 128 to an imaging member 52. The end caps 134 may be mated within the ends of the cylindrical wall 130 by spin welding, gluing, or the like. One or both end caps 134 may be provided with a fill and/or vent port (not shown) to facilitate the filling of the release agent reservoir with release agent. Alternatively, one end cap is installed to seal the tube 120 at one end and then the tube filled with release agent before the other end cap is installed. Incorporation of a fill and vent port in an end cap, however, facilitates refilling of the reservoir, if necessary.

The containment membrane 124 is made from a porous oil phobic material having a relatively small pore size. The small pore size regulates the supply rate of release agent wicked from the perforations at a consistent, sustainable rate. For example, in one embodiment, the pore size of the material used for the containment membrane is about 0.5 µm to about 20 µm. Such porous oil phobic materials include polytetrafluoroethylene (PTFE), extended PTFE, GORE-TEX, and the like. In one embodiment, the containment membrane 124 is comprised of one or more layers of such material. In one embodiment of the release agent applicator, the containment membrane 124 is glued to the perforated wall of the release agent reservoir.

The delivery layer 128 is optionally made from a material having a relatively large pore size. The size of the pores in the delivery layer is larger than the size of the perforations in the release agent reservoir. The larger pore size provides an adequate supply of release agent for immediate application to an imaging member and enables the delivery layer to pick up release agent that has been diverted into the sump. The matching of the delivery layer to the containment membrane as described above helps ensure that the uptake rate of the delivery layer 128 is greater than the release agent supply rate through the containment membrane 124. Materials that may be used for the delivery layer 128 are well known and are sometimes called foam material. Such materials include oil compatible foams of urethane, polyvinyl chloride (PVC), ethylene vinyl acetate (EVA), cross-linked polyethylene, nitrile butadiene rubber (NBR), or the like. In one embodiment of the release agent applicator, the pore sizes in the delivery layer are in the range of about 50 µm to about 100 µm.

According to certain embodiments, the pores within delivery layer 128 are produced through a salt leaching process wherein finely ground salt particles of a predetermined size are evenly distributed throughout the materials during their formation or curing process. Then, after the material has cured, the material is soaked within an appropriate solvent to leach the salt particles from the material, thereby leaving voids or pores approximately equal to the size of the salt particles previously embedded within the cured material.

The reader should understand that the exemplary release agent applicator 110 discussed above can be implemented in many alternate forms and variations, and may include additional materials or structures, or may lack some materials and structures disclosed herein.

The release agent within the applicator 110 often comprises a hydrophobic oil having electrically insulating properties that enable electrical static charge to accumulate on the surface of delivery layer 128 of release agent applicator 110. In at least one embodiment, the release agent applicator includes a conductive layer 126 that enables electrostatic charge of the surface of the layer 128 to dissipate before an appreciable amount of charge accumulates. Conductive layer 126 may be formed through the application of an ionic solution operable to adhere to, and/or evenly penetrate, the material used for delivery layer 128, thereby leaving an ionic surface coating that forms conductive layer 126. Illustratively, the ionic solution in one embodiment comprises at least one organic composition having at least one positively charged or polarized functional group, at least one organic composition having at least one negatively charged or polarized functional group, and a solvent.

According to certain embodiments, the at least one at least one organic composition having at least one positively charged functional group and the at least one organic composition having at least one negatively charged functional group comprise organic salts with a positive charge, and negative charge, respectively, when dissolved within an appropriate solvent. By way of non-limiting example, the at least one negatively charged functional group comprises an acetate, carbonate, phosphate, sulfate, oxide, nitrate, nitrite, hydroxide, citrate, cyanine or other negatively charged functional group or metal. Likewise, by way of non-limiting example, the at least one positively charged functional group comprises an ammonium, pyridinium, amine, or other positively charged functional group or metal. According to certain embodiments, the negatively charged and positively charged organic salts are applied in a solution dissolved in an appropriate solvent. Further according to certain embodiments, the negatively charged and positively charged organic salts are present in equimolar amounts. Alternatively, the negatively charged and positively charged organic salts are present in molar amounts that form a net neutral, net positive, or net negative charge when the two organic compositions are present in an appropriate solvent.

According to at least one exemplary embodiment, conductive layer 126 is formed through coating delivery layer 128 with an ionic solution including at least one amine and at least one phosphate. In other embodiments, this ionic solution and at least one phosphate combination is mixed with a polar solvent. For instance, this embodiment of the conductive layer 126 is formed through coating delivery layer 128 with an ionic solution comprising triethanolamine and alkyl ester phosphate in an aqueous solution in approximately equimolar amounts, wherein water is the solvent therein. Such a solution may be produced through the reaction of phosphoric acid with a selected alkyl ester, or purchased in several formulations under the EMPHOS trade name (Chemtura, Middlebury, Conn.).

According to certain embodiments, the ionic solution comprises approximately 1%-10% (wt) organic compositions and approximately 90%-99% solvent. In other embodiments, the ionic solution comprises approximately 2%-6% (wt) organic compositions and approximately 94%-98% solvent. Finally, according to certain embodiments, the ionic solution comprises approximately 3%-5% (wt) organic compositions and approximately 95%-97% solvent. Optionally, according to certain embodiments, the ionic solution is prepared to have a conductivity between 0.5 mS and 3.0 mS. In other embodiments, the ionic solution is prepared to have a conductivity between 1.0 mS and 2.0 mS. In yet another embodiment, the ionic solution is prepared to have a conductivity between 1.2 mS and 2.0 mS.

According to certain embodiments, a method for making a release agent applicator having a consistent, decreased surface resistivity includes evenly coating the delivery layer 128 of a release agent applicator after the release agent applicator has been surfaced to a final diameter. In certain embodiments, the delivery layer 128 is evenly coated between 1 and 10 times with an ionic solution as described above, and allowed to dry, thereby forming conductive layer 126. In other embodiments, the delivery layer 128 is coated between 2 and 5 times with the ionic solution and allowed to dry.

Figure 5:
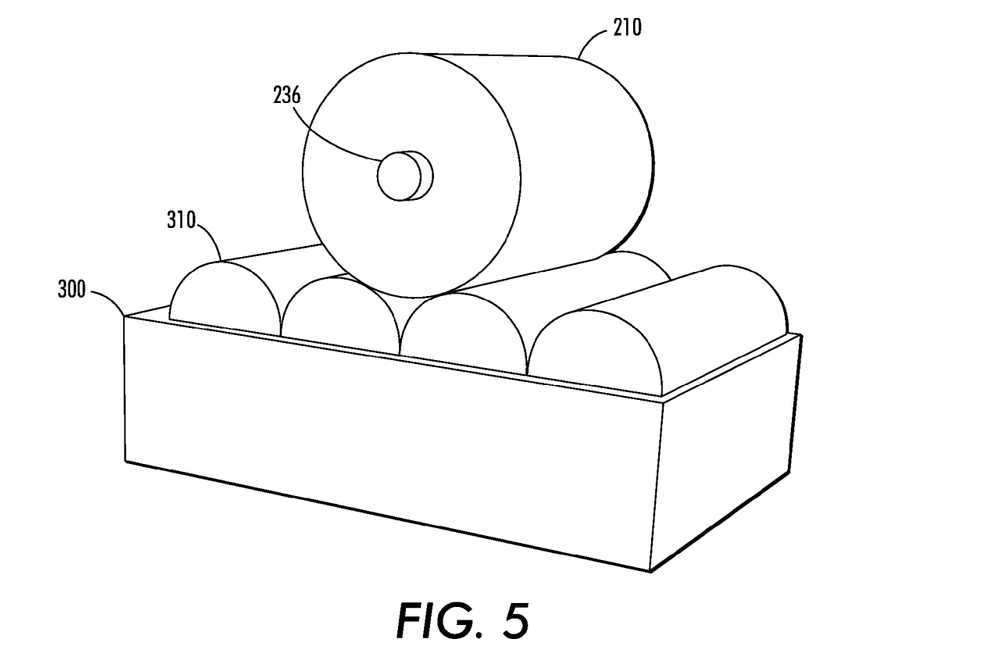
FIG. 5 is a schematic diagram of an embodiment for applying a coating to a release agent applicator.

Coating may be performed via spraying, hand applying, dipping, or other known coating means. In certain embodiments, as schematically depicted in FIG. 5, a cylindrical release agent applicator 210 is surface coated via a roller surface coating machine 300 that comprises a plurality of application rollers 310 suspended over, and in contact with, an ionic solution maintained within reservoir 320 such that each application roller 310 maintains an even coating of the ionic solution as it is rotated. In operation, a release agent applicator 210 is coated by applying a downward force against shaft 236 such that the outer surface of cylindrical release agent applicator 210 maintains contact with at least one application roller 310. Thereafter, release agent applicator 210 is rotated, thereby causing the at least one application roller to turn in an opposite direction and coat the surface of release agent applicator 210 with the ionic solution at the point of contact with application roller 310. A full revolution of release agent applicator 210 over the at least one application roller 310 is equivalent to one coat of the ionic solution. According to certain embodiments, release agent applicator 210 is rotated at a rate of approximately 40 to 100 revolutions per minute. In other embodiments, release agent applicator 210 is rotated at a rate of approximately 50 to 70 revolutions per minute. After the desired number of coats of ionic solution has been applied, the release agent applicator 210 is optionally inspected to ensure that no dry spots are on the surface of the delivery layer. These dry spots indicate an uneven coating or absorption of the solution. Any release agent applicator displaying dry spots is optionally culled and the remaining rollers are allowed to dry.

The coated release agent applicators 210 may be dried in a temperature controlled environment wherein the temperature is held at approximately 55°-70° C. for a period of approximately 4 hours to 8 hours. In certain embodiments, the coated release agent applicators are dried at a temperature of approximately 60° C. for a period of approximately 4 hours to 6 hours. Thereafter, the dried, coated release agent applicators 210 are allowed to cool, and held in an environment of approximately 85% relative humidity at approximately 25° C.

According to certain embodiments, the resistivity of a foam delivery surface displays a reduction in surface resistance of approximately 86%, and an approximately 98% reduction in the standard deviation across the foam delivery surface after treatment as noted above. As such, treatment according to the above embodiment both significantly reduces resistivity and increases consistency of resistivity across the foam delivery surface. In certain other embodiments, treatment according to the methods disclosed herein results in an average reduction in resistivity of approximately two hundred and fifty times that of an average untreated delivery surface. Further, according to certain embodiments, the treatment of a foam delivery surface according to the methods disclosed above results in an average resistivity less than about 75 M$\Omega$, less than about 55 M$\Omega$, less than about 45 M$\Omega$, less than about 35 M$\Omega$, less than about 25 M$\Omega$, or less than about 15 M$\Omega$. Further, according to certain embodiments, the treatment of a foam delivery surface according to the methods disclosed above results in point resistivity at all measured areas on a delivery surface that is less than about 75 M$\Omega$, less than about 55 M$\Omega$, less than about 45 M$\Omega$, less than about 35 M$\Omega$, less than about 25 M$\Omega$, or less than about 15 M$\Omega$. It will be appreciated that treatment of the foam delivery surface according to methods described herein results in a relatively consistent resistivity across the delivery surface.

In one exemplary embodiment, resistivity is measured utilizing a roller having a foam delivery surface and a resistivity meter, for example, a Fluke 1507 Resistivity Meter set to, for example 250 volts. According to certain embodiments, resistivity is measured on the delivery surface utilizing the resistivity meter at one or more preselected points along the length of the delivery surface of the roller. For example, a surface probe connected to the resistivity meter is placed in contact with a first point on the delivery surface of the roller to perform a surface resistivity check, and the probe is placed in contact with the surface after which the resistivity meter is engaged for a preselected time (for example, pushing the "test" button for five seconds). Thereafter, the resistivity meter reading is optionally recorded for quality control purposes. Thereafter, a surface probe connected to the resistivity meter is optionally placed in contact with a second point on the delivery surface of the roller to perform a surface resistivity check, and the same procedure is followed to record the surface resistivity at the second preselected point on the delivery surface. It will be appreciated that such a process can be iteratively repeated for the desired number of measurements along preselected points of the delivery surface.

Further, according to certain exemplary embodiments, multiple points on the delivery surface of the roller can be selected and tested in this fashion to determine the consistency of the surface resistivity along the roller. For example, one may select five points equidistant from one another along a straight line running the length of the roller. Alternatively, multiple random points along the surface of the roller are selected and tested. In one embodiment to increase speed and consistency, a jig is constructed having five probes beginning at a first end of the roller and ending at the opposite end of the roller longitudinally, with each probe approximately equidistant from one another. Optionally, such a jig can be assembled with a cable port connection between the probes and the resistivity meter, operable to allow a user to iteratively select each one of the probe connections to test for resistivity at each one of the probe locations. Once each of the probes is iteratively selected, allowed to be in contact with the delivery surface with the resistivity meter activated for at least five seconds, and then recorded, another roller can optionally be inserted under the jig for testing. According to certain optional embodiments, the roller may be rotated during the five second testing period to measure the resistivity along the rotated surface rather than a single point. Further, According to certain embodiments, if any of the tested points exceed a preselected resistivity, the roller is rejected for use.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A release agent applicator for a printing apparatus having a reduced surface resistivity, the release agent applicator comprising:
   at least one substantially cylindrical shaft,
   a substantially cylindrical body radially surrounding the shaft, the body having an outer surface comprising a foam,
   an ionic layer adhered to the outer surface, the ionic layer comprising an organic compound having at least one functional group selected from the group consisting of acetate, carbonate, phosphate, sulfate, oxide, nitrate, nitrite, hydroxide, citrate, cyanine, ammonium, pyridinium, amine, and halide.

2. The release agent applicator of claim 1, wherein the ionic layer is one or more coats of an ionic solution comprising an amine.

3. The release agent applicator of claim 1, wherein the ionic layer is one or more coats of an ionic solution comprising an ester phosphate and an amine.

4. The release agent applicator of claim 3, wherein the foam is urethane, polyvinyl chloride, ethylene vinyl acetate, cross-linked polyethylene, or nitrile butadiene rubber.

5. The release agent applicator of claim 3, wherein the release agent supply applicator is cured at a temperature above 55° C. for at least four hours after the application of the ionic solution.

6. The release agent applicator of claim 3, wherein the surface resistivity does not exceed approximately 75 MΩ.

7. The release agent applicator of claim 3, wherein the surface resistivity does not exceed approximately 55 MΩ.

8. The release agent applicator of claim 1, wherein the ionic layer is one or more coats of an ionic solution comprising triethanolamine and alkyl ester phosphate dissolved in water.

9. The release agent applicator of claim 1, wherein the ionic layer is formed through applying one or more coats of an ionic solution comprising approximately 0.5% to 3% (wt) triethanolamine, approximately 0.5% to 3% (wt) alkyl ester phosphate, and approximately 99% to 94% water.

10. A release agent applicator in a printing apparatus, the release agent applicator comprising:
   at least one substantially cylindrical shaft,
   a substantially cylindrical body radially surrounding the shaft, the body having an outer surface comprising a foam,
   an ionic layer adhered to the outer surface, the ionic layer comprising one or more coats of an ionic solution comprising an ester phosphate and an amine organic compound.

11. The release agent applicator of claim 10, wherein the ionic layer is an ionic solution comprising approximately 0.5% to 3% (wt) triethanolamine, approximately 0.5% to 3% (wt) alkyl ester phosphate, and approximately 99% to 94% water.

12. The release agent applicator of claim 10, wherein the ionic layer is an ionic solution comprising triethanolamine and alkyl ester phosphate dissolved in water.

13. The release agent applicator of claim 10, wherein the foam is urethane, polyvinyl chloride, ethylene vinyl acetate, cross-linked polyethylene, or nitrile butadiene rubber.

14. A release agent applicator in a printing apparatus, the release agent applicator comprising:
   at least one substantially cylindrical shaft,
   a substantially cylindrical body radially surrounding the shaft, the body having an outer surface comprising a foam,
   an ionic layer adhered to the outer surface, the ionic layer comprising one or more coats of an ionic solution comprising triethanolamine and alkyl ester phosphate.

15. The release agent applicator of claim 14, wherein the surface resistivity does not exceed approximately 75 MΩ.

16. The release agent applicator of claim 14, wherein the surface resistivity does not exceed approximately 55 MΩ.

17. The release agent applicator of claim 14, wherein the foam is urethane, polyvinyl chloride, ethylene vinyl acetate, cross-linked polyethylene, or nitrile butadiene rubber.

18. The release agent applicator of claim 14, wherein the ionic layer is cured at a temperature above 55° C. for at least four hours.

* * * * *